United States Patent
Kim et al.

(10) Patent No.: US 7,127,728 B2
(45) Date of Patent: Oct. 24, 2006

(54) FRONT PANEL DRIVING APPARATUS

(75) Inventors: Man Ki Kim, Pyeongtaek-si (KR); Sang Jin Youn, Suwon-si (KR)

(73) Assignee: LG Electronics, Inc., Seoul (KR)

( * ) Notice: Subject to any disclaimer, the term of this patent is extended or adjusted under 35 U.S.C. 154(b) by 651 days.

(21) Appl. No.: 10/610,884

(22) Filed: Jul. 2, 2003

(65) Prior Publication Data
US 2004/0205792 A1     Oct. 14, 2004

(30) Foreign Application Priority Data
Nov. 25, 2002   (KR) .................... 10-2002-0073673

(51) Int. Cl.
*G11B 33/12*     (2006.01)
(52) U.S. Cl. .................................................... 720/655
(58) Field of Classification Search ................ 720/655, 720/652, 646, 619; 206/722, 723, 724
See application file for complete search history.

(56) References Cited

U.S. PATENT DOCUMENTS 4,562,566 A * 12/1985 Eisemann .................... 720/655
4,811,314 A *  3/1989 Alves ........................... 369/10
5,872,756 A    2/1999 Shime

FOREIGN PATENT DOCUMENTS

JP       07-014374       1/1995

* cited by examiner

*Primary Examiner*—Angel Castro
(74) *Attorney, Agent, or Firm*—Fleshner & Kim, LLP

(57) ABSTRACT

A front panel driving apparatus for a car audio system comprises a main chassis, a slider base fitted inside the main chassis, and a slider. A plurality of roller structures are provided for promoting a more stable motion of the slider. The roller structures are formed between the slider base and the slider. A front panel is opened or closed by translating vertically when the slider moves back and forth. A lower end portion of the front panel is hinged upon a front end portion the slider. Projections that are protruded from both upper ends of the front panel are mounted inside generally vertical tracks of a front frame that is attached to a front of the main chassis.

30 Claims, 8 Drawing Sheets

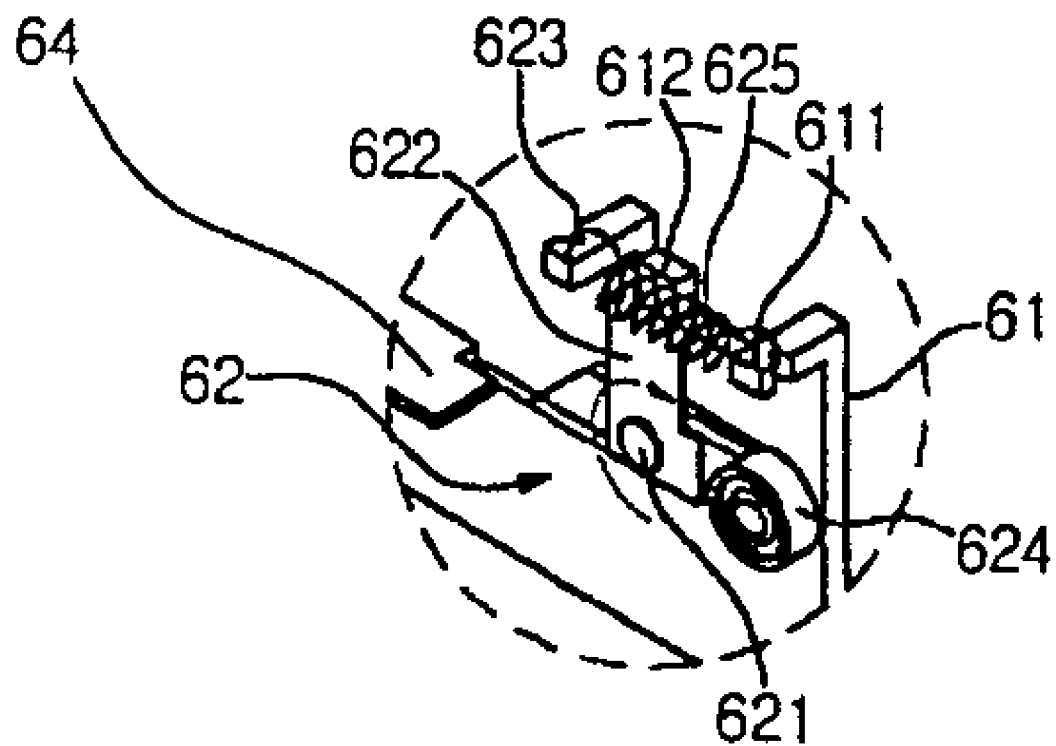

FRONT PANEL DRIVING APPARATUS

BACKGROUND OF THE INVENTION

1. Field of the Invention

The present invention relates to a front panel driving apparatus for a car audio system that includes a display portion occupying most of the front surface of the car audio system. More particularly, the present invention relates to a front panel driving apparatus promoting more smooth and stabilized operation of the front panel as it opens/closes.

2. Background of the Related Art

Increasing importance has been placed on in-car entertainment systems, especially car audio systems, as one of essential components of a car. Recently, various kinds of media players have been mounted in cars.

For instance, U.S. Pat. No. 6,398,168 discloses a flip down system, in which the car audio system comprises a front display panel, the front panel being vertically translated as recording media is inserted or taken out.

FIG. 1 is a side view of a front panel driving apparatus for a car audio system according to a related art. FIG. 2 is a plan view showing part of the front panel driving apparatus for a car audio system according to the related art.

Referring to FIGS. 1 and 2, the front panel driving apparatus includes a driving motor 10 formed on a main chassis (not shown), a gear train 12 for transferring a driving force of the driving motor 10, and a driving pinion 20 engaged with a final gear of the gear train 12, being formed on the main chassis.

More specifically, the driving pinion 20 is composed of a large gear portion 22 and a small gear portion 24, both being in a cylindrical shape. The large gear portion 22 is engaged with the final gear of the gear train 12, and the small gear portion 24 is interlocked with a rack 28.

Also, a slider 25 that slides back and forth is disposed on the top of a lower surface of the main chassis, and both ends of the slider 25 and its bottom surface are supported by a plurality of sliding structures.

It is considered very important to leave a space between the main chassis and the slider 25 for the sake of convenience of assembling work, and for more smooth motion of the slider 25 when the front panel is in operation.

The slider 25 is a plate in a designated shape. A panel connection ball (e.g. roller) 26 is formed at the end of the slider 25 to help the front panel (not shown) of the car audio system to rotate vertically around the connection ball 26.

Operational principles of the conventional front panel driving apparatus for the car audio system are now explained. The driving force from the driving motor 10 is transferred to the driving pinion 20, more particularly, to the large gear portion 22, through the gear train 12. The rotational force upon the driving pinion 20, on the other hand, is transferred to the rack 28 that is engaged with the small gear portion 24 of the driving pinion 20. In this way, the driving force from the driving motor 10 is transferred to the rack 28, making the rack 28 move horizontally. This horizontal motion of the rack 28 is transferred to the slider 25, and as a result, the slider 25 slides in or out of the main chassis.

The slide's horizontal motion is then converted to a motion of the front panel connected to the panel connection ball 26, consequently opening or closing the front panel.

However, several drawbacks were observed in the above-described related art.

As described before, there is a designated space in the vertical direction between the slider 25 and the main chassis that supports the slider 25. This space sometimes allows an external vibration to be transferred to the slider 25. Such vibration resultantly shakes the car audio front panel that is connected to the front end portion of the slider 25. This vibration of the front panel can also damage other compartments or cause a mechanical trouble. This problem occurs more frequently under difficult driving conditions, such as, on bumpy roads, and most of drivers become irritated by the vibration movement of the front panel.

However, it is not a good idea to reduce the space between the slider 25 and the main chassis to prevent the vibration of the front panel because this only makes assembling the slider and front panel more difficult. Moreover, in so doing, the slider 25 could fall into around the main chassis.

SUMMARY OF THE INVENTION

An object of the invention is to solve at least the above problems and/or disadvantages and to provide at least the advantages described hereinafter.

Accordingly, one object of the present invention is to solve the foregoing problems by providing a front panel driving apparatus having a construction in which a supporting frame with a roller is formed on a contact surface between a slider and a slider base, thereby enabling the slider to move more smoothly.

Another object of the present invention is to provide a front panel driving apparatus in which the slider and front panel thereof are not easily affected by an external shock or vibration.

The foregoing and other objects and advantages are realized by providing a front panel driving apparatus for a car audio system which includes a main chassis having a designated internal space and a pair of stoppers protruded inward from both sides. A slider base is fitted inside of the main chassis as a separate component from the main chassis. A driving unit with a motor is locked upon a top surface of the slider base. A slider, which slides in and out of the main chassis while moving on the slider base is powered by the driving unit. A front panel for opening/closing a front surface of the main chassis as the slider slides in and out of the main chassis is hinged upon a lower portion of the slider. A front frame guides at least one side of the front panel. The audio system also includes a roller assembly having at least a pressing roller for pressing the slider down using an elastic force, the roller assembly being formed at both front ends of the slider base.

According to another aspect of the invention, the car audio system includes a fixed roller structure for promoting a smooth sliding in/out motion of the slider. The roller structure is fixed on the slider and a contact surface of the slider base. A shiftable roller structure is formed on the slider and the contact surface of the slider base, the shiftable roller being able to shift in one direction using a rotation force provided by an elastic member, so as to promote a smooth sliding in/out motion of the slider.

According to another aspect of the invention, the front frame has a guide inserted therein for guiding the back and forth motion of the slider, the guide being protruded to at least one side from an upper portion of the front panel. In this embodiment, a roller structure for promoting a more smooth back and forth motion of the slider is formed on a contact region between the slider and the slider base. A position of the roller shifts with respect to one of the slider or the slider base through an elastic member and a rolling surface of the roller comes into touch with the other of the slider and the slider base.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements, and wherein:

FIG. 3B is an enlarged view of a portion of the front panel driving apparatus for a car audio system as shown in FIG. 3A;

DETAILED DESCRIPTION OF PREFERRED EMBODIMENTS

The following detailed description will present a front panel driving apparatus for a car audio system, according to a preferred embodiment of the invention, in reference to the accompanying drawings.

Figure 1:
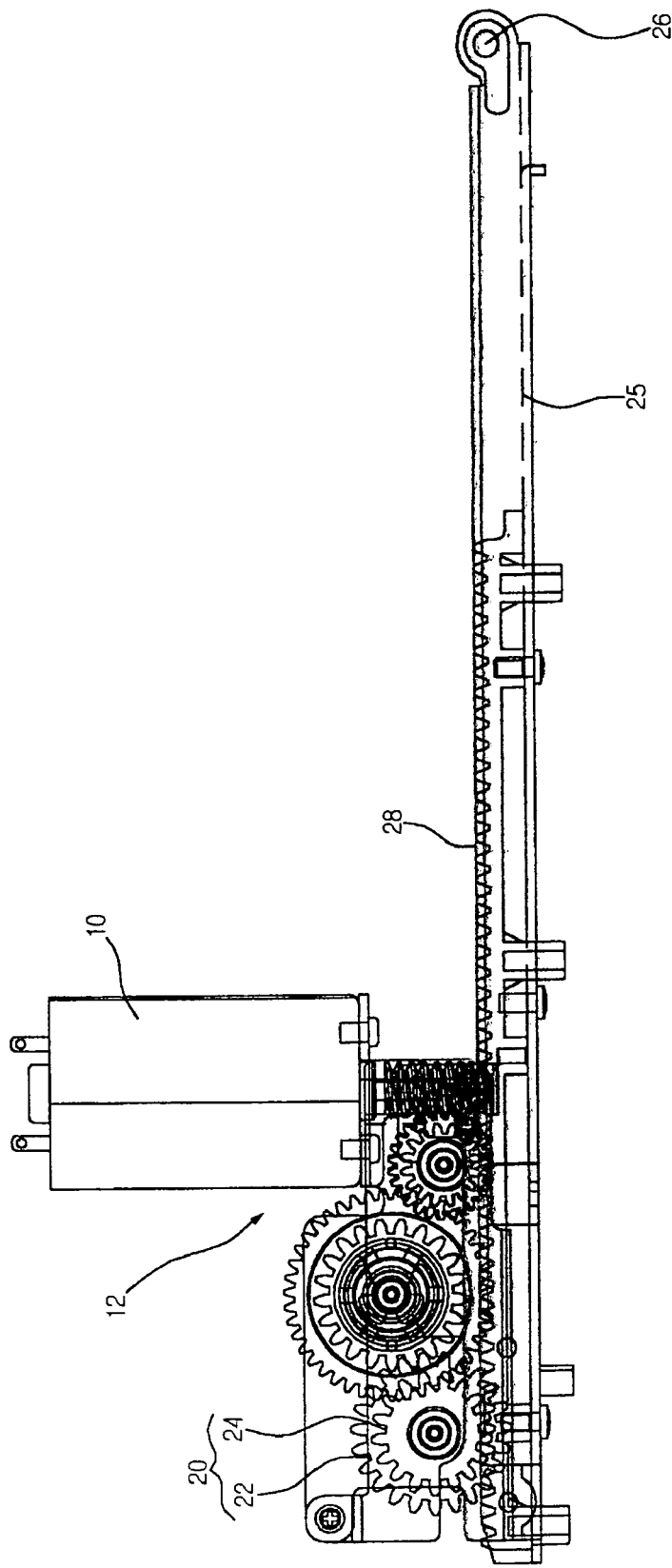
FIG. 1 is a side view of a front panel driving apparatus for a car audio system according to a related art.
Figure 2:
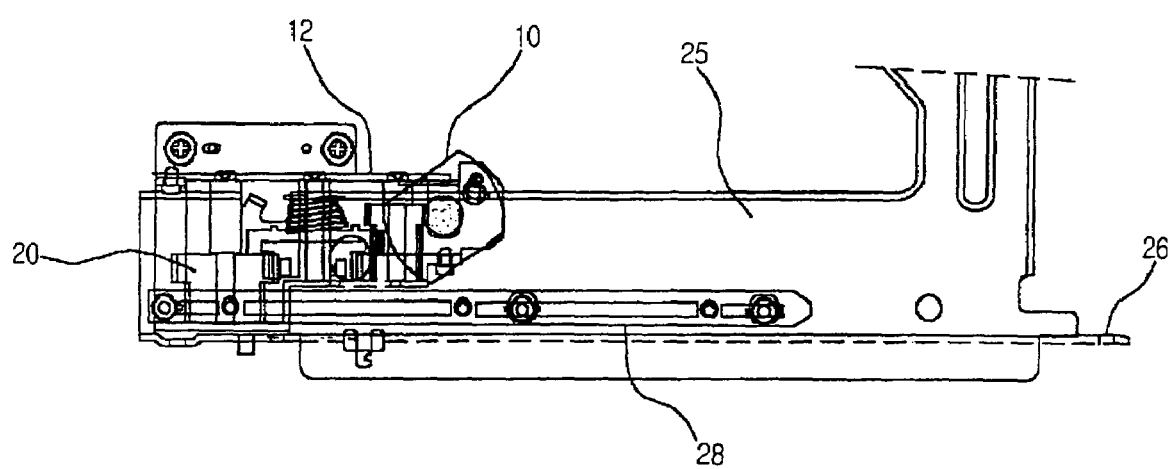
FIG. 2 is a plan view showing part of the front panel driving apparatus for a car audio system according to the related art.
Figure 3A:
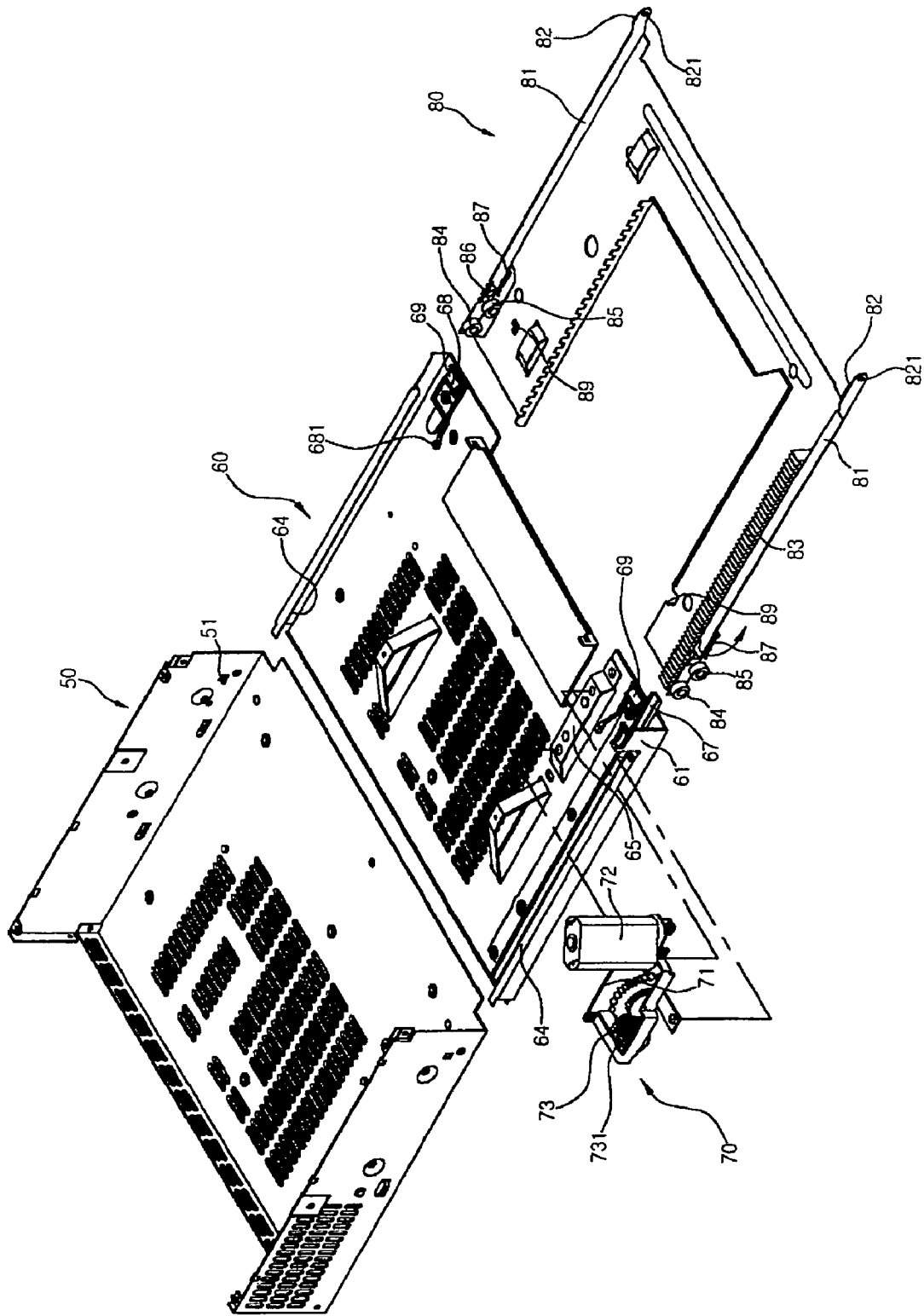
FIG. 3A is an exploded perspective view of a front panel driving apparatus for a car audio system according to the present invention.

FIGS. 3A and 3B are an exploded perspective view and an enlarged view of a front panel driving apparatus for a car audio system according to the present invention. Referring to FIGS. 3A and 3B, the front panel driving apparatus for a car audio system according to the present invention includes a main chassis 50 as an exterior frame of the apparatus, being formed by folding (or bending) both ends of a rectangular-shaped metal plate in the vertical direction. A slider 80 is mounted on a lower portion of an inner surface of the main chassis 50 for enabling the front panel on its front end portion to rotate. A slider base 60 is fixed on the lower portion of the inner surface of the main chassis 50 for guiding a horizontal motion of the slider 80.

Although it is not shown in the drawing, a designated cover can be optionally formed on a top surface of the main chassis 50. In such case, a compact disk player, a cassette tape player and a plurality of circuits can be mounted into the interior space formed by the main chassis 50 and the cover.

To briefly explain the operating principles of the present invention, the slider base 60 is fixed on the lower surface of the main chassis 50, and the slider 80 slides in or out of the main chassis. The front end of the slider 80 is hinged upon the lower portion of the front panel for the car audio system, allowing the front panel to be opened/closed.

A plurality of special supporting frames are formed between the slider base 60 and the slider 80 so as to help the slider 80 to move more stably.

As shown in FIG. 3, a pair of stoppers 51 is formed on the both ends of the main chassis 50, the stoppers being opposite to each other. In fact, the stoppers 51 are formed by cutting part of the main chassis 50 and folding it inwardly. The stoppers 51 are formed on the front portions of the main chassis 50. The operation and function of the stoppers 51 will be detailed later.

The slider base 60 is laid on the top surface of the main chassis 50, and its ends are fitted into the inside surfaces of the main chassis 50. In short, the slider base 60 is a separate element from the main chassis 50.

To explain more, the slider base 60 is composed of a driving unit 70, an attachment slot 65 to which the driving unit 70 is attached, and a guide portion 64. The attachment slot 65 is formed by folding the bottom surface of the slider base 60 upwardly, and as a result, a hole for inserting a screw is formed. The guide portion, on the other hand, is formed by folding the ends of the slider base 60 in the lateral direction, and similar to the attachment slot 65, holes for inserting screws are formed.

The driving unit 70 provides a driving force the slider 80 needs to move. In general, the driving unit 70 is situated over the top surface of the attachment slot 65 and the guide portion 64. The driving unit 70 is composed of a driving motor 72 and a gear train 73 having a plurality of gears. The driving motor and the gear train ate formed on a driving frame 71. The final gear of the gear train 73 is a driving pinion 731. The driving pinion 731 is composed of a large gear portion and a small gear portion. The small gear portion is engaged with the rack 83 and transfers the driving force from the driving motor 72 to the rack 83.

The rack 83 is formed in the longitudinal direction, along one side of the slider The rack 83 is engaged with the driving pinion 731 and receives the driving force of the driving motor 72. Using the driving force received, the rack 83 helps the slider 80 to move in and out of the main chassis 50 against the slider base 60 that is securely positioned in a relative sense.

Figure 5:
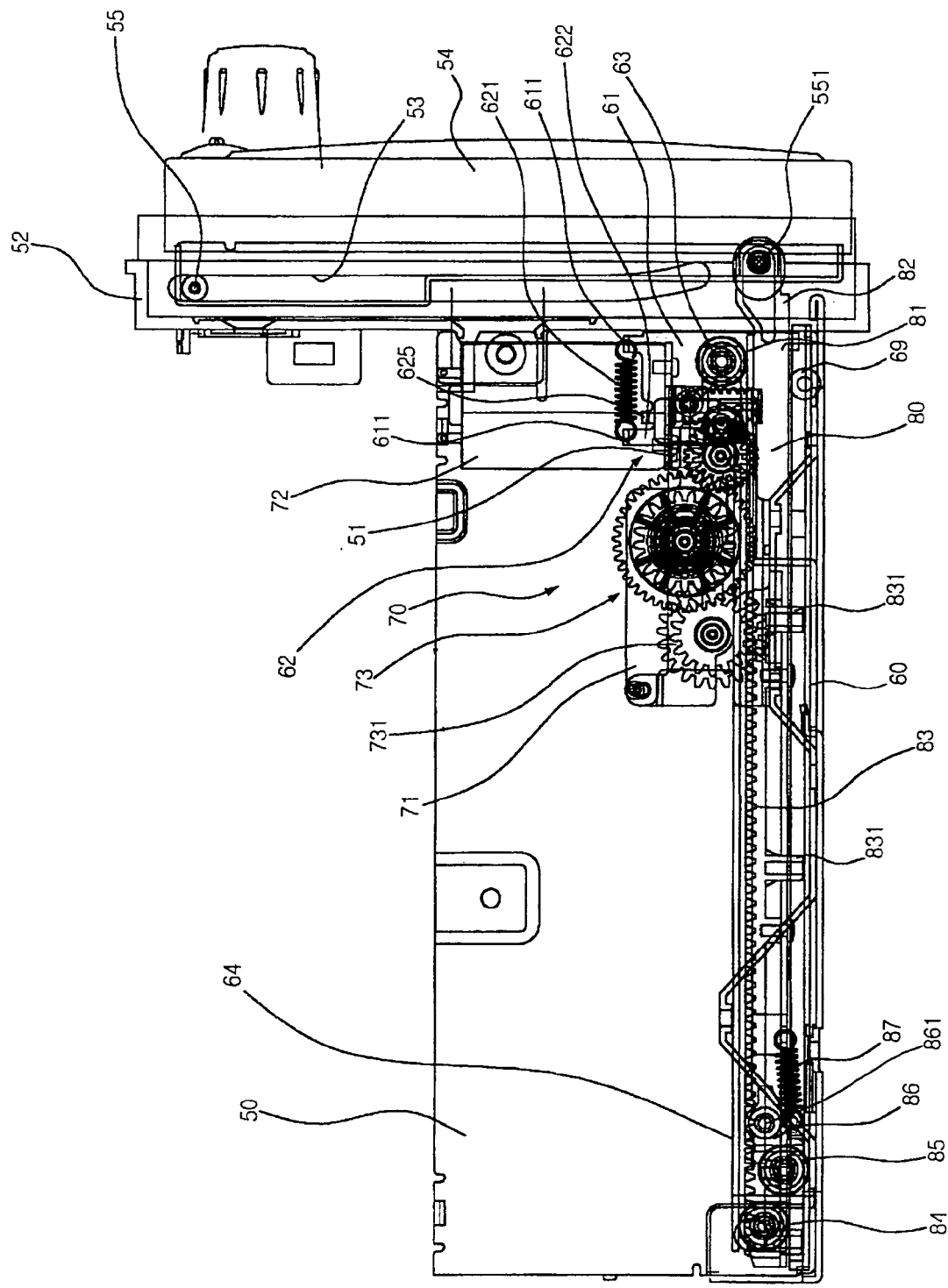
FIG. 5 is an explanatory diagram showing a state where the front panel driving apparatus of the present invention is closed.

Formed on the lower portion of the rack 83 is a motion guide projection (refer to 831 of FIG. 5). The motion guide projection (refer to 831 of FIG. 5) is disposed inside the guide rail 67 that is formed on the top surface of the slider base 60, whereby when the slider 80 translates back and forth, it is inserted or pulled out.

Taking advantage of the above construction, when the slider 80 slides back and forth, the motion guide projection 831 is guided by the guide rail 67, which in turn helps the slider 80 not to be slid off in the horizontal direction, and the slider can move on the slider base 60 more stably.

Meanwhile, a locking stopper 68 is protruded from the top surface on the front of the slider base 60, and a stopper arm 681 that is able to elastically extend upwardly from the locking stopper 68 is also formed on the slider base 60. Also, a suspension 89 is formed on the slider 80 opposite to the stopper 68.

When the slider 80 is pulled out from the main chassis 50 more than a designated distance, the locking stopper 68 and the suspension 89 contact one another. That is, they prevent the slider 80 from sliding too far out of the slider base 60 and falling off the rails arbitrarily. In order to separate the slider 80 from the slider base 60, suspension 89 must be released from the stopper arm 681 by elastically distorting the stopper arm 681.

Figure 6:
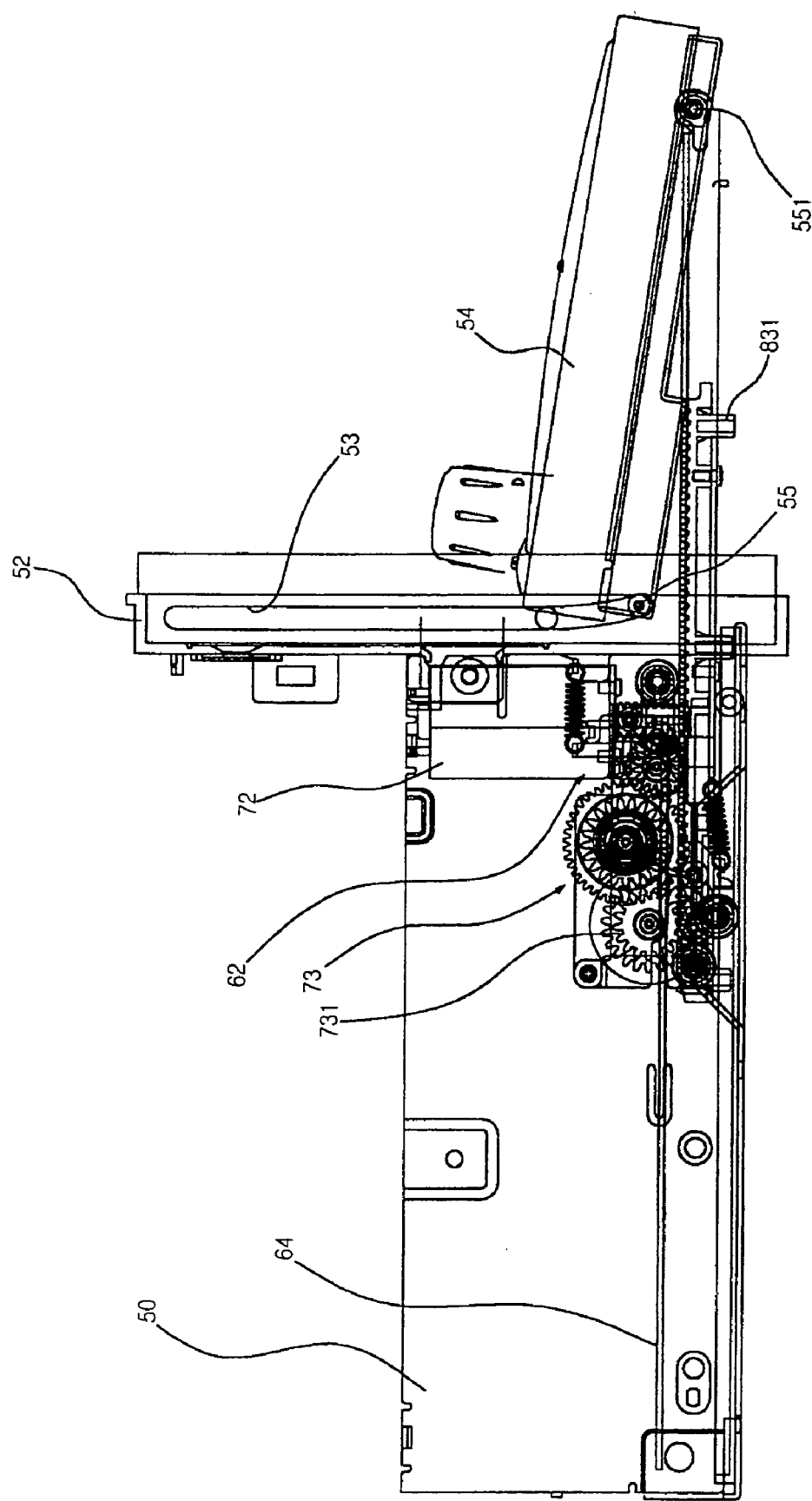
FIG. 6 is an explanatory diagram showing a state where the front panel driving apparatus of the present invention is opened.

FIGS. 5 and 6 diagrammatically explain the operation of the front panel driving apparatus for the car audio system according to the present invention. FIG. 5 illustrates a state in which the front panel is closed; and FIG. 6 illustrates a state in which the front panel is opened.

To explain the operation of the front panel driving apparatus for the cat audio system with reference to FIGS. 5 and 6, it is also necessary to introduce a front frame 52, which is formed on the front end of the main chassis 50 and an additional (or secondary) front panel 54, which is formed on the front surface of the front frame 52.

More specifically speaking, a cam groove 53 is formed in the longitudinal direction on the both ends of the front frame 52, respectively. A guide axis 55 is formed on the ends of the top portion of the front panel, along the cam groove 53. In addition, a rotation axis 551, which is hinged on a panel connection portion 82 on the front end of the slider 80, is formed on the ends of the lower part of the front panel 54.

In this manner, the front panel 54 selectively opens/closes the front surface of the front frame 52. To be more specific, the front panel 54 opens/closes the front surface of the front frame 52 in order to operate the apparatus mounted on the front surface of the front frame 52 or to adjust a setting angle of the display portion built in the panel 54.

The front panel 54 moves in response to the sliding in/out motion of the slider 80. In other words, the lower end of the front panel 54, which is hinged upon the front end of the slider 80, translates back and forth with the slider 80. As a result, the guide axis 55, guided by the cam groove 53, translates vertically. This is how the front panel changes its position as suggested in FIGS. 5 and 6.

As shown in FIG. 3B, a pressing roller 624 is formed on the front end of the slider base 60. The pressing roller 624 presses the slider 80 downward to determine the vertical position of the slider. Also, there is a setting plate 61 formed on the inner surfaces of the front end of the slider base 60, and a roller assembly 62 that is hinged upon the setting plate 61 through a hinge pin 621. The roller assembly 62 includes the pressing roller 624.

On the upper end of the setting plate 61, a locking projection 611 is formed. A rotation controller 612 is formed on the other side of the locking projection 611. As shown in the drawing, there is the pressing roller 624 disposed at one end of the roller assembly 62 for pressing the slider 80, and a roller lever 622 is folded upwardly from the opposite side of the pressing roller 624 centering around the hinge pin 621. The locking projection 623 is folded from the upper end of the roller lever 622. Moreover, a pair of the locking projections 611 and 623 are connected through a pressing spring 625, whereby the roller assembly 62 can receive more turning force in the arrow direction when pivoting on the hinge pin 621.

To explain about the operation of the pressing roller 624, the roller lever 622 is situated at the setting plate 61 in such a manner that it pivots upon the hinge pin 621, and the rotatable pressing roller 624 is situated at one end of the setting plate 61. The roller lever 622 is subjected to the elastic force from a lever spring 625 in the arrow direction that is shown in the figure, and as a result, the pressing toller 624 gets enough turning force to press the slider 80.

Here, the rotation controller 612 controls the pressing roller 624 not to press the slider 80 too much or the roller lever 622 to rotate too much when the slider 80 is assembled. Overall, the rotation controller 612 serves to facilitate assembling of the slider 80. Also, as for the opposite direction, the rotation controller 612 sets a rotation limit on the roller lever 622 using the stopper 51. The stopper 51 is usually formed inside of the main chassis 50 not to be interfered with installation of the slider 80 in the slider base 60.

There is a side fence 81 being folded upwardly on the both ends of the slider 80 in the longitudinal direction. It is the pressing roller 624 that presses the side fence 81 down, the pressing roller 624 being securely fixed compared to the slider 80. Because of this pressure from the pressing roller 624, the slider 80, despite the presence of an external shock, does not get easily pulled up.

In addition, there is the panel connection portion 82 that is formed as the side fence 81 is extended to the front side of the slider 80, and a panel connection ball 821 is formed additionally on the front end of the panel connection portion 82, to which the rotation axis 55 is inserted. Since the operations of the panel connection portion 82 and the rotation axis 55 are already explained above, no further details will be provided.

The following explains how to stabilize the downward motion of the slider 80 by supporting the lower surface of the slider 80. To help the slider 80 to move more smoothly, a supporting roller 69 is formed on the both sides of the top surface of the slider base 60, respectively, supporting the lower surface of the slider 80. In other words, when the slider 80 moves back and forth, the supporting roller 69 supports the lower surface of the slider 80 and stabilizes the downward motion of the slider 80. Especially, the supporting roller 69 is formed on the front end of the slider base 60, which means that the supporting roller 69 can support the vertical position of the slider 80 wherever the slider 80 is.

Turning now to the rear end of the slider 80, explained below is how the vertical position of the rear end of the slider 80 is supported. To begin with, there is the folded guide portion 64 formed on the upper ends of the slider base 60, and guide rollers 84 and 85 formed on the both rear ends of the side fence 81. One of the guide rollers 84 touches the lower surface of the guide portion 64 of the slider base 60, and the other guide roller 85 touches the top surface of the slider base 60. More specifically, the guide portion 64 extends along the ends of the slider base 60, starting from the rear side of the setting plate 61. The guide portion 64 is folded in the perpendicular direction.

The guide roller 85 that touches the lower surface of the slider base 60 is supported to be able to rotate. That is, the guide roller is composed of the roller lever (refer to 86 of FIG. 4) that pivots on the hinge pin 861 at the side fence 81. A spring 87 is fixed on the lower ends of the slider base 60 and the roller lever 86. The guide roller 85 is fixed on one end of the roller lever 86. Particularly, the hinge pin 861 is formed on the upper end of the roller lever 86, enabling the roller lever 86 to rotate in the arrow direction (counterclockwise) through the spring 87. With the above construction, the guide roller 85 closely sticks to the bottom surface of the slider base 60 with much stronger force.

On the other hand, the guide rail 67 is formed on the top surface of the slider base 60 in the longitudinal direction along one side of the slider base 60. With help of the motion guide projection 831, the guide rail 67 enables the slider 80 to move more smoothly.

The operation or function of the front panel driving apparatus for the car audio system having the above construction will now be described.

The slider base 60 is fixed on the bottom surface of the main chassis 50, and the slider 80 is mounted on the slider base 60 in a manner that the slider slides in and out of the main chassis 50. The driving force of the driving motor 72 moves the slider 80. As the slider 80 slides in and out of the main chassis 50, the panel, as shown in FIG. 5, either closes the front surface of the front frame 52 or opens, as shown in FIG. 6, the front surface of the front frame 52, directing the front surface of the front panel 54 to upwards.

In other words, when the driving motor 72 is in operation while the panel is being closed as in FIG. 5, the driving force of the driving motor 72 is transferred finally to the slider 80 through the gear train 73, and the driving pinion 731 and the rack 83, the two being engaged with each other.

Receiving the driving force of the driving motor 72, the slider 80 slides in and out of the main chassis 50. At this time, the front panel 54 connected to the front end of the slider 80 through the rotation axis 551, more particularly, the guide axis 55 on the both upper ends of the front panel 54 is guided along the cam groove 53 of the front frame 52.

In more detail, when the slider 80 slides out of the main chassis 50, the front surface of the front panel 54 gradually faces upwards and the lower end of the front panel 54 is taken out together with the slider 80. When the slider 80 slides in the main chassis 50, the guide axis 55 mounted on the both upper ends of the front panel 54 rises along the cam groove 53.

The guide rollers 84 and 85 rotate in contact with the slider base 60 and guide the slider's movement. More specifically, the guide rollers 84 and 85 are formed on the rear end of the slider 80, and are sandwiched in between the top surface of the slider base 60 and the lower surface of the guide portion 64. The guide rollers help the rear end of the slider 80 to move more stably.

Also, the supporting roller 69 helps the slider's movement as well by rolling or rotating in touch with the lower surface of the slider 80. More specifically, the supporting roller 69 is fastened on the top surface of the slider base 60 so it can support the slider 80 upwards from its designated position on the slider base 60 wherever the slider 80 moves.

Lastly, the pressing roller 624 guides the slider's move by rolling or rotating in touch with the upper end of the side fence 81 of the slider 80. More specifically, the pressing roller 624 is situated on the front end of the slider base 60 so that it can push the slider 80 downwards from its designated position on the slider base 60 wherever the slider 80 moves.

Briefly explaining again about these rollers 84, 85, 69, and 624, the pressing roller 624 presses the upper end of the side fence 81 downwards, one guide roller 84 rolls along the lower surface of the guide portion 64, the other guide roller 85 presses on the top surface of the slider base 60, and the supporting roller 69 supports the lower surface of the slider 60. In this way, the slider 60 does not easily run off to other directions except for its original movement direction and moves back and forth only as designed. In consequence, the front panel 54 that is supported by the slider 70 does not vibrate at random, but moves back and forth or vertically as intended.

Because the pressing roller 624 presses the side fence 81 in the arrow direction (clockwise) using the elastic force of the lever spring 625 and the guide roller 85 presses the slider base in the arrow direction (counterclockwise) using the elastic force of another spring 87, the slider 70 and the front panel 54 can secure their positions.

Explained now is the installation method of the main chassis 50, the slider base 60 and the slider 80. The slider 80 is first mounted on the slider base 60. At this time, the slider base 60 is not yet mounted on the main chassis 50. That is, the rear end of the slider 80 is inserted in between the top surface of the slider base 60 and the lower side of the pressing roller 624. At this time, since the roller lever 622 having the pressing roller 624 is not yet supported by the stopper 51, it is easily pulled back. Hence, the slider 80 can be easily inserted.

Figure 4A:
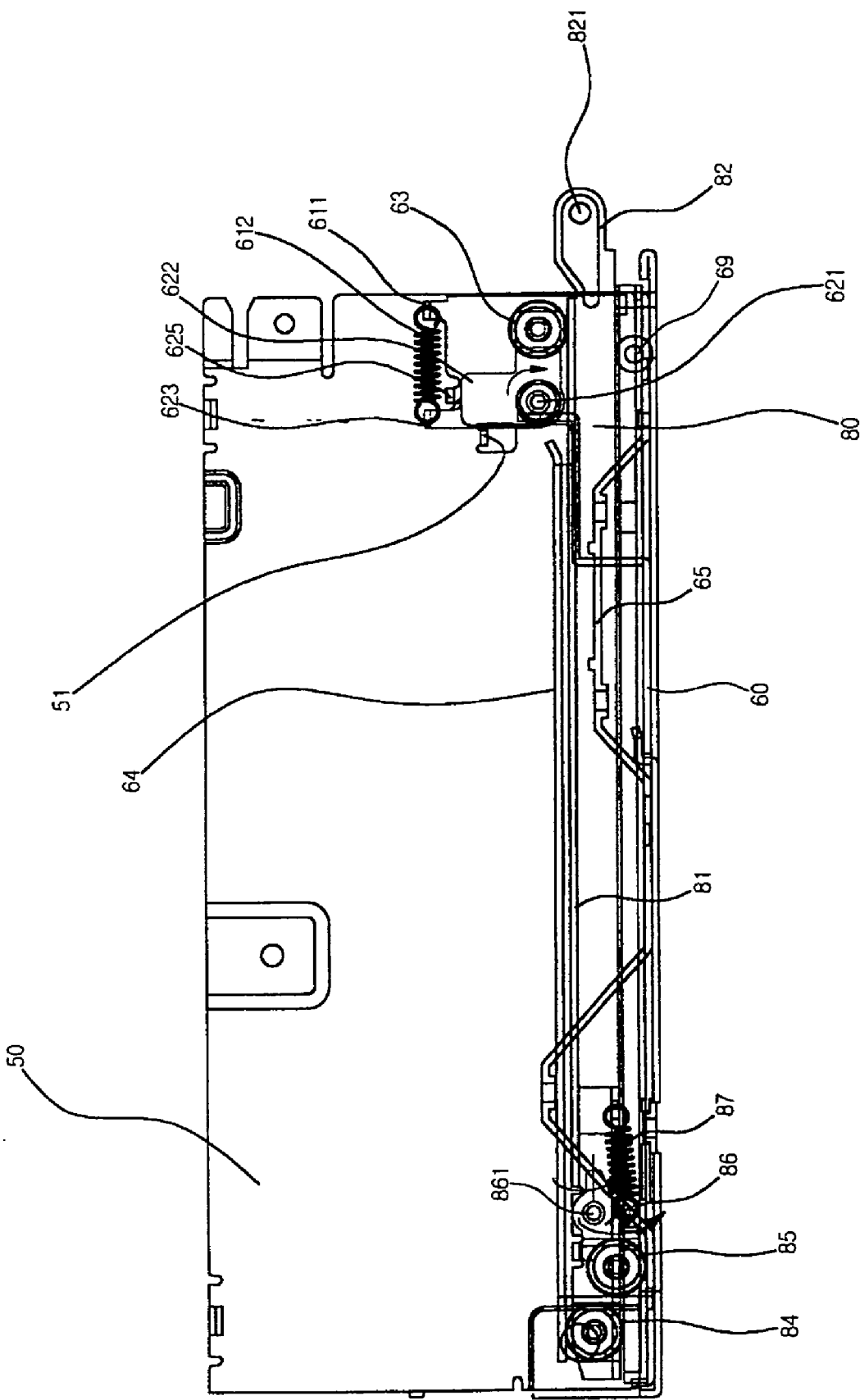
FIG. 4A is a side view of the front panel driving apparatus for a car audio system according to the present invention.
Figure 4B:
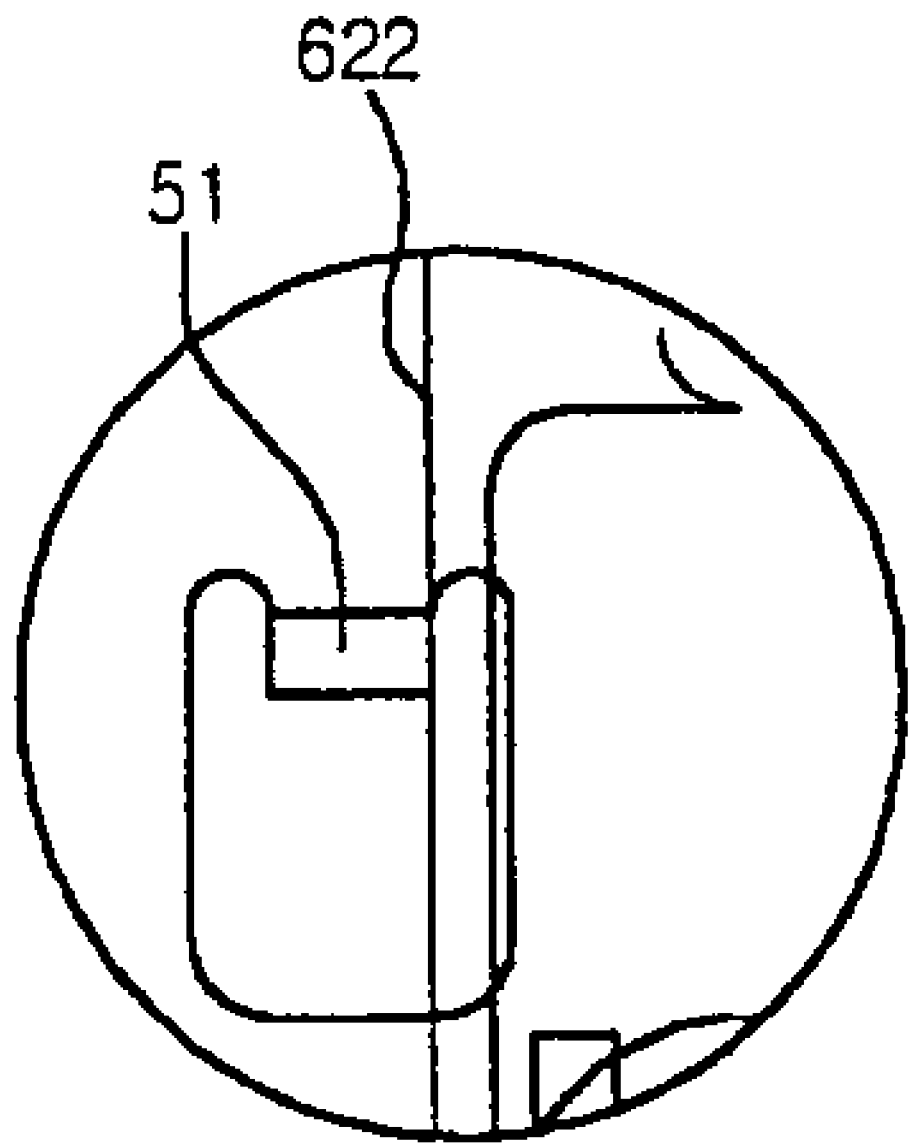
FIG. 4B is an enlarged view of a portion of the front panel driving apparatus for a car audio system as shown in FIG. 4A.

Once the slider 80 and the slider base 60 are inserted and locked, the slider base 60 is inserted into the main chassis 50. When the slider base 60 is inserted from the front end of the main chassis 50 to the inside thereof, the stopper 51 of the main chassis 50, as shown in FIG. 4A, controls the ultimate range of movement of the roller lever 622. As such, the roller lever 622 is in a state that it cannot rotate any more, and the pressing roller 624 firmly presses the upper end of the side fence 81 of the slider 80, and the slider 80 does not easily get off upwards.

To summarize, according to the front panel driving apparatus for the car audio system according to the present invention, the slider that slides in and out of the main chassis is disposed on the slider base mounted with a roller. This roller presses the slider and helps it to move more stably. As such, the slider is much less influenced by an external shock and as a result, it does not easily move around the main chassis, thereby improving an operational reliability of the front panel.

While the invention has been shown and described with reference to certain preferred embodiments thereof, it will be understood by those skilled in the art that various changes in form and details may be made therein without departing from the spirit and scope of the invention as defined by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A front panel driving apparatus for a car audio system, comprising:
    a main chassis having a designated internal space;
    a slider base, which is fitted inside of the main chassis as a separate component from the main chassis;
    a driving unit mounted over the slider base, the driving unit including a motor;
    a slider, configured to slide in and out of the main chassis along the slider base, wherein the slider is moved in and out of the main chassis by the driving unit; and
    a pair of roller assemblies mounted on front ends of the slider base, wherein each roller assembly includes a pressing roller configured to press the slider down using an elastic force.

2. The apparatus according to claim 1, further comprising a pair of stoppers, wherein each stopper protrudes inward from a side of the main chassis, and wherein each stopper limits movement of a corresponding roller assembly.

3. The apparatus according to claim 1, further comprises a supporting roller for supporting a lower surface of the slider, the supporting roller being mounted over the slider base.

4. The apparatus according to claim 1, further comprising:
a pair of guide portions formed on sides of the slider base, wherein each guide portion comprises a U-shaped channel; and
at least two guide rollers attached to the rear of the slider, wherein the guide rollers are configured to contact the guide portions and to suppress vertical movement of the slider.

5. The apparatus according to claim 4, wherein the at least two guide rollers comprise two pairs of guide rollers, each pair of guide rollers being attached to a rear of the slider, and wherein a first guide roller of each pair contacts a bottom surface of one of the guide portions, and wherein the second guide roller of each pair contacts an upper surface of one of the guide portions.

6. The apparatus of claim 5, wherein one of the guide rollers of each pair is elastically mounted on the slider such that the guide roller elastically presses against the guide portion.

7. The apparatus according to claim 1, further comprising a rack attached to the slider, the rack being configured to receive a driving force of the driving unit, the rack extending along a motion direction of the slider.

8. The apparatus according to claim 1, further comprising:
at least one motion guide projection mounted on the slider and protruding below a bottom surface of the slider; and
a guide rail mounted on the slider base, wherein the guide rail is configured to receive the at least one motion guide and to guide a back and forth motion of the slider.

9. The apparatus according to claim 1, further comprising a side fence formed by folding a side edge of the slider upward, wherein the side fence is configured to contact one of the pressing rollers.

10. The apparatus according to claim 1, wherein each roller assembly comprises:
a roller lever that is rotatably mounted upon a front end portion of the slider base, wherein the pressing roller is mounted on the roller lever; and
an elastic member attached between the roller lever and the slider base, wherein the elastic member provides an elastic force that biases the pressing roller against a top surface of the slider.

11. A front panel driving apparatus for a car audio system, comprising:
a main chassis having a designated internal space;
a separate slider base fitted inside the main chassis;
a driving unit mounted over the slider base;
a slider slidably mounted on the slider base and configured to slide in and out of the main chassis using a driving power of the driving unit;
a fixed roller mounted on one of the slider and the slider base, the fixed roller being configured to roll along the other of the slider and the slider base as the slider moves in and out of the main chassis; and
a shiftable roller mounted on one of the slider and the slider base, the shiftable roller being configured to roll along the other of the slider and the slider base as the slider moves in and out of the main chassis, wherein the shiftable roller is movable; and
an elastic member coupled to the shiftable roller and configured to bias the shiftable roller against the other of the slider and the slider base.

12. The apparatus according to claim 11, wherein both the fixed roller and the movable roller are mounted on the slider.

13. The apparatus according to claim 12, further comprising a guide portion formed on the slider base, and wherein the fixed roller and the movable roller are mounted on rear ends of the slider and are configured to roll along the guide portion of the slider base.

14. The apparatus according to claim 13, further comprising a roller lever that is rotatably mounted on the slider, wherein the movable roller is mounted on the roller lever, and wherein the elastic member is attached between the slider and the roller lever and is configured to bias the movable roller against the guide portion.

15. The apparatus according to claim 11, wherein both the fixed roller and the movable roller are mounted on the slider base.

16. The apparatus according to claim 15, further comprising:
a roller lever that is rotatably mounted on a front portion of the slider base, wherein the movable roller is mounted on the roller lever; and
an elastic member mounted between the roller lever and the slider base and configured to bias the movable roller against the slider.

17. The apparatus of claim 16, wherein the movable roller is configured to press against a top surface of the slider and wherein the fixed roller is mounted such that it rolls against a bottom surface of the slider.

18. The apparatus according to claim 16, further comprising a rotation controller configured to limit a rotation of the roller lever in a first direction, wherein the rotation controller comprises a protrusion formed on the slider base.

19. The apparatus according to claim 18, further comprising a stopper configured to limit rotation of the roller lever in a second direction, wherein the stopper comprises a protrusion formed on the main chassis.

20. The apparatus according to claim 11, further comprising:
a motion guide projection formed on a lower surface of the slider; and
a guide rail mounted on the slider base, extending in the movement direction of the slider, and configured to receive the motion guide projection and to guide the slider as it moves in and out of the main chassis.

21. The apparatus according to claim 11, further comprising:
a stopper protrusion formed on a lower surface of the slider; and
a movable blocking member mounted on the slider base and configured to contact the stopper protrusion on the slider as the slider moves out of the main chassis to prevent the slider from separating from the slider base.

22. The apparatus of claim 21, wherein the movable blocking member can be moved into a release position in which the blocking member no longer contacts the stopper protrusion such that the slider can be removed from the slider base.

23. A front panel driving apparatus for a car audio system, comprising:
a main chassis having a designated internal space;
a separate slider base fitted inside the main chassis;
a slider slidably mounted on the slider base and configured to slide in and out of the main chassis;
a shiftable roller mounted on one of the slider and the slider base, the shiftable roller being configured to roll along the other of the slider and the slider base as the slider move in and out of the main chassis, wherein the shiftable roller is movable; and
an elastic member coupled to the shiftable roller and configured to bias the shiftable roller against the other of the slider and the slider base.

24. The apparatus according to claim 23, wherein the shiftable roller is mounted on the slider.

25. The apparatus according to claim 24, further comprising a guide portion formed on the slider base, and wherein the shiftable roller is mounted on a rear end of the slider, and wherein the shiftable roller is configured to roll along the guide portion of the slider base.

26. The apparatus according to claim 25, further comprising a roller lever that is rotatably mounted on the slider, wherein the shiftable roller is mounted on the roller lever, and wherein the elastic member is attached between the slider and the roller lever and is configured to bias the shiftable roller against the guide portion.

27. The apparatus according to claim 23, wherein the shiftable roller is mounted on the slider base.

28. The apparatus according to claim 27, further comprising a roller lever that is rotatably mounted on a front portion of the slider base, wherein the shiftable roller is mounted on the roller lever, and wherein the elastic member is mounted between the roller lever and the slider base and configured to bias the shiftable roller against the slider.

29. The apparatus according to claim 28, wherein the shiftable roller is configured to press against a top surface of the slider.

30. The apparatus according to claim 23, wherein the shiftable roller comprises a first shiftable roller, wherein the elastic member comprises a first elastic member, and further comprising:

a second shiftable roller mounted on the other of the slider and the slider base, wherein the second shiftable roller is movable; and a second elastic member coupled to the second shiftable roller.

* * * * *